United States Patent
Iyer et al.

(10) Patent No.: US 12,332,978 B2
(45) Date of Patent: Jun. 17, 2025

(54) METHODS AND SYSTEMS FOR WATERMARKING DOCUMENTS

(71) Applicant: Zoho Corporation Private Limited, Kanchipuram District (IN)

(72) Inventors: Sujatha S Iyer, Guduvanchery (IN); Balachandar S, Guduvanchery (IN); Ramprakash Ramamoorthy, Singaperumal Koil (IN); Shailesh Kumar Davey, Potheri (IN)

(73) Assignee: Zoho Corporation Private Limited, Kanchipuram District (IN)

( * ) Notice: Subject to any disclaimer, the term of this patent is extended or adjusted under 35 U.S.C. 154(b) by 260 days.

(21) Appl. No.: 17/969,683

(22) Filed: Oct. 20, 2022

(65) Prior Publication Data

US 2023/0185886 A1 Jun. 15, 2023

Related U.S. Application Data

(60) Provisional application No. 63/313,772, filed on Feb. 25, 2022.

(30) Foreign Application Priority Data

Dec. 14, 2021 (IN) .............................. 202141058225

(51) Int. Cl.
*G06F 21/16* (2013.01)
*G06T 3/40* (2024.01)
*G06V 30/14* (2022.01)
*G06V 30/19* (2022.01)
*G06F 21/10* (2013.01)

(52) U.S. Cl.
CPC ................ *G06F 21/16* (2013.01); *G06T 3/40* (2013.01); *G06V 30/1448* (2022.01); *G06V 30/19* (2022.01); *G06F 21/1063* (2023.08)

(58) Field of Classification Search
CPC .... G06F 21/16; G06V 30/1448; G06V 30/19; G06V 30/10; G06T 2201/0062
See application file for complete search history.

(56) References Cited

U.S. PATENT DOCUMENTS

| | | | |
|---|---|---|---|
| 11,120,520 B2 | 9/2021 | Voynov et al. | |
| 2002/0076111 A1* | 6/2002 | Dance | G06V 30/245 |
| | | | 382/229 |
| 2004/0001606 A1* | 1/2004 | Levy | G06K 15/1831 |
| | | | 382/100 |

(Continued)

OTHER PUBLICATIONS

Z. Jalil and A. M. Mirza, "A Review of Digital Watermarking Techniques for Text Documents," 2009 International Conference on Information and Multimedia Technology, Jeju, Korea (South), 2009, pp. 230-234, doi: 10.1109/ICIMT.2009.11. (Year: 2009).*

(Continued)

*Primary Examiner* — Robert B Leung
(74) *Attorney, Agent, or Firm* — Silicon Edge Law Group LLP; Arthur J. Behiel

(57) ABSTRACT

Described are methods and system that digitally watermark documents using an encoding scheme that embeds unique identifiers into the files by perturbing the relative heights of words to create patterns that are imperceptible to the human eye but decodable to recover the identifiers. The unique identifiers can be precoded before they are embedded in the documents.

19 Claims, 11 Drawing Sheets

(56) References Cited

U.S. PATENT DOCUMENTS

| | | | | |
|---|---|---|---|---|
| 2004/0158724 | A1* | 8/2004 | Carr | G06F 21/31 713/186 |
| 2006/0075241 | A1* | 4/2006 | Deguillaume | H04N 1/32256 713/176 |
| 2011/0047454 | A1* | 2/2011 | Sugimoto | G06F 40/103 715/255 |
| 2011/0051989 | A1* | 3/2011 | Gao | H04N 1/32144 382/100 |
| 2012/0240243 | A1* | 9/2012 | Allardyce | G06F 21/6218 726/28 |
| 2015/0228045 | A1* | 8/2015 | Mehta | G06T 1/0064 382/103 |
| 2020/0065574 | A1* | 2/2020 | Kuhlmann | G06V 30/153 |
| 2020/0372482 | A1* | 11/2020 | Li | G06Q 20/1235 |
| 2021/0092255 | A1* | 3/2021 | Xu | H04N 1/32219 |

OTHER PUBLICATIONS

H. Lu, F. DingYi, G. XiaoLin, C. XiaoJiang, X. XinBai and L. Jin' An, "A New Chinese Text Digital Watermarking for Copyright Protecting Word Document," 2009 WRI International Conference on Communications and Mobile Computing, Kunming, China, 2009, pp. 435-439, doi: 10.1109/CMC.2009.207. (Year: 2009).*

Ahvanooey et al. "A Comparative Analysis of Information Hiding Techniques for Copyright Protection of Text Documents." Security and Communication Networks, Hindawi Publishing Corporation, Apr. 2018, pp. 1-22 (23 pages).

Alotaibi et al. "Improved Capacity Arabic Text Watermarking Methods Based on Open Word Space." Journal of King Saud University—Computer and Information Sciences, vol. 30, No. 2, Elsevier BV, Jan. 2017, pp. 236-248 (13 pages).

Bianchi et al. "Secure Watermarking for Multimedia Content Protection: A Review of Its Benefits and Open Issues." IEEE Signal Processing Magazine, vol. 30, No. 2, Institute of Electrical and Electronics Engineers, Feb. 2013, pp. 87-96 (10 pages).

Choo, Hyon-Gon., et al. "Data-Hiding Capacity Improvement for Text Watermarking Using Space Coding Method." Division of Electrical and Computer Engineering Lecture, Springer Science+ Business Media, 2003, pp. 593-599 (7 pages).

Culnane, C., et al. "Improving Mutli-set Formatted Binary Text Watermarking Using Continuous Line Embedding." International Conference on Innovative Computing, Information and Control, IEEE, 2007, 6 pages.

Fang, Wei., et al. "A Survey of Big Data Security and Privacy Preserving." IETE Technical Review, vol. 34, No. 5, Taylor and Francis, Sep. 2016, pp. 1-18 (18 pages).

Gupta et al. "Secure Data Storage and Sharing Techniques for Data Protection in Cloud Environments: A Systematic Review, Analysis, and Future Directions." IEEE Access, vol. 10, IEEE, Jan. 2022, pp. 71247-77 (31 pages).

Kamaruddin, Nurul Shamimi., et al. "A Review of Text Watermarking: Theory, Methods, and Applications." IEEE Access, IEEE, 2018, (21 pages).

Khadam et al. "Advanced security and privacy technique for digital text in smart grid communications", Computers and Electrical Engineering, vol. 93, Elsevier, 2021, pp. 1-11 (11 pages).

Kumar, Ashwani. "A Review on Implementation of Digital Image Watermarking Techniques Using LSB and DWT." Advances in Intelligent Systems and Computing, Springer Nature, 2020, pp. 595-597 (4 pages).

Nematollahi, M.A., et al. "Chapter 8: Text Watermarking." Digital Watermarking, STSP, vol. 11, Springer Science +Business Media, 2017, pp. 121-129 (9 pages).

Ou, Chaoli, "Text Watermarking for Text Document Copyright Protection." Computer Science 725 Term Paper, Jun. 2003, pp. 1-12 (12 pages).

Qadir, Muhammad Abdul., et al. "Digital Text Watermarking: Secure content Delivery and Data Hiding in Digital Documents." IEEE Aerospace and Electronic Systems Magazine, IEEE, Dec. 2006, pp. 18-21 (5 pages).

Rashid, Aaqib. "Digital Watermarking Application and Techniques: A Brief Review." International Journal of Computer Applications Technology and Research, vol. 5, No. 3, 2016, pp. 147-150 (4 pages).

Saini, Sameeka., et al. "Securing web contents through invisible text watermarking for copyright protection." International Journal of Engineering Development and Research, vol. 6, No. 3, 2018, pp. 257-261 (5 pages).

Singh A. K., et al. "A Survey on Healthcare Data: A Security Perspective." ACM Trans. Multimedia Comput. Commun. Appl., vol. 17, No. 2s, Article 59, May 2021 (26 pages).

Tayan, Omar., et al., editors. "An Adaptive Zero-Watermarking Approach for Text Documents Protection." Proceedings of the Second Intl. Conf. on Advances in Computer and Information Technology, Institute of Research Engineers and Doctors, 2013, pp. 205-208 (5 pages).

Vaezi, Seyed, "A Review of Copyright Protection Approaches in Electronic Commerce (Watermarking Method)." Proceedings of the Fifth International Conference on Electronic Business, AISeL, 2005, pp. 441-447 (8 pages).

Yang, Huijuan., et al. "Text Document Authentication by Integrating Inter Character and Word Spaces Watermarking." International Conference on Multimedia and Expo, IEEE, 2004, pp. 955-958 (4 pages).

Leaksid, "LeaksID VDR (Virtual Data Room)," http://web.archive.org/web/20210929153746/https://leaksid.com/how-it-works, Sep. 2021 (4 pages).

Wikipedia, "Huffman Coding," https://en.wikipedia.org/w/index.phptitle=Huffman_coding oldid=1058444378, last edited on Dec. 3, 2021, at 15:21 (UTC) (11 pages).

* cited by examiner

500

| Digit | Huffman Code |
|---|---|
| 0 | 0001 |
| 1 | 0000 |
| 2 | 0101 |
| 3 | 0010 |
| 4 | 10 |
| 5 | 110 |
| 6 | 0011 |
| 7 | 0100 |
| 8 | 011 |
| 9 | 111 |

| | | |
|---|---|---|
| Sample unique ID | | 3 4 9 2 |
| Position numbering | | 0 1 2 3 |

Sum of odd places $= 2 + 4 = 6$

Sum of even places $= 9^2 + 3^2 = 9+9 = 18$ $9^2 = 81 = 8+1 = 9$ $3^2 = 9$

Sum of odd places + Sum of even places $= 24$

Checksum digit $= 24 \bmod 10 = 4$

Unique ID after appending checksum digit $= 34924$

FIG. 10

METHODS AND SYSTEMS FOR WATERMARKING DOCUMENTS

TECHNICAL FIELD

The invention relates to provisions for file security.

BACKGROUND

File sharing among employees in an organization is an everyday task. People with file access can "leak" sensitive information to the outside world, leading to reputational and financial losses. There is therefore a need for methods and systems for identifying leaked documents and the entity or entities responsible for their unauthorized disclosures.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for encoding a user identifier in a document. The method also includes extracting text elements from the document, each of the text elements having respective renderable dimensions. The method also includes encoding the user identifier into the renderable dimensions of the text elements. Other embodiments of this aspect include corresponding computer systems, apparatus, and computer programs recorded on one or more computer storage devices, each configured to perform the actions of the methods.

Implementations may include one or more of the following features. The method where the text elements may include at least one of words and letters. The method may include, for each of the words: delineating a bounding box around the word, the bounding box encompassing an area that includes the word and background content; scaling the area; and replacing or covering the word with the scaled area. The background content includes a margin around the text elements and sufficient to cover the word when the area is scaled down. The reading may include recognizing the text elements. Encoding the user identifier into the renderable dimensions of the text elements may include associating the document with a document identifier, pre-encoding the user identifier with the document identifier into a bitstream and encoding the bitstream into the renderable dimensions of the text elements. The method may include extracting the bitstream from the document. The method may include encoding instances of the bitstream into the renderable dimensions of the text elements. The method may include separating the instances of the bitstream with an end marker. The document includes pages, and where every page includes at least a portion of the bitstream, an end marker, or both. Implementations of the described techniques may include hardware, a method or process, or computer software on a computer-accessible medium.

One general aspect includes a method of identifying a user associated with a document. The method of identifying also includes detecting text elements in the document, the text elements having respective dimensions. The identifying also includes decoding a user identifier from the dimensions. Other embodiments of this aspect include corresponding computer systems, apparatus, and computer programs recorded on one or more computer storage devices, each configured to perform the actions of the methods.

Implementations may include one or more of the following features. The method may include scanning the document to extract the text elements. The text elements are words arranged in lines, the method may include normalizing the dimensions of the words relative to dimensions of the lines before decoding the user identifier. The document is associated with a document identifier, the method may include decoding the decoded user identifier using the document identifier. Decoding the decoded user identifier using the document identifier may include extracting a bitstream from the dimensions and extracting the user identifier from the bitstream with the document identifier. Implementations of the described techniques may include hardware, a method or process, or computer software on a computer-accessible medium.

A document in accordance with one embodiment includes rendered or renderable text elements having rendered or renderable dimensions. The document also includes a user identifier encoded in variations in or between the rendered or renderable dimensions of the text elements. Other embodiments of this aspect include corresponding computer systems, apparatus, and computer programs recorded on one or more computer storage devices, each configured to perform the actions of the methods.

Implementations may include one or more of the following features. The document where the text elements may include words. The renderable dimensions include heights of the words. The document includes pages, and where at least a partial instance of the user identifier is encoded on each of the pages. The document may include encoded markers separating the at least partial instances of the user identifier. Implementations of the described techniques may include hardware, a method or process, or computer software on a computer-accessible medium.

One general aspect includes a system for encoding a user identifier in a document. The system also includes memory to store the document. The system also includes at least one processing unit coupled to the memory, the at least one processing unit to read text elements from the document, each of the text elements having respective renderable dimensions, and encode the user identifier into the renderable dimensions of the text elements. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings are illustrative and not limiting. The left-most digit(s) of a reference number identifies the figure in which the reference number first appears. The same numbers are used throughout the figures to reference like features and components.

FIG. 5 is a Huffman table 500 corresponding to tree 400 of FIG. 4.

FIG. 10 illustrates a process for incorporating a checksum into a Precoded user ID, a four-digit sample precoded user ID of 3492 in this example.

DETAILED DESCRIPTION

People and organizations must safeguard confidential documents from malicious or inadvertent disclosure, or "leaks." As a protection measure, documents can be digitally watermarked using an encoding scheme that embeds a user identifier (user ID) unique to a person in control of the file. The user ID may identify the document's author, a recipient of the document, or both. The encoding technique (1) extracts text elements—e.g. letters or words—from a digital document and detects the renderable dimensions—e.g. height and width—of those elements as they will appear if the document is rendered on paper or a monitor; and (2) encodes a user ID into the renderable dimensions, such as by introducing visually imperceptible perturbations in the heights of words to be rendered. The dimensions of the perturbed renderable elements are normalized relative to other document features, such as line height, to account for differences in how the document may be rendered. The user ID can then be recovered by detecting and decoding the perturbations in rendered or renderable documents. A leaked document can thus be inspected to identify the source of the leak.

Figure 1:
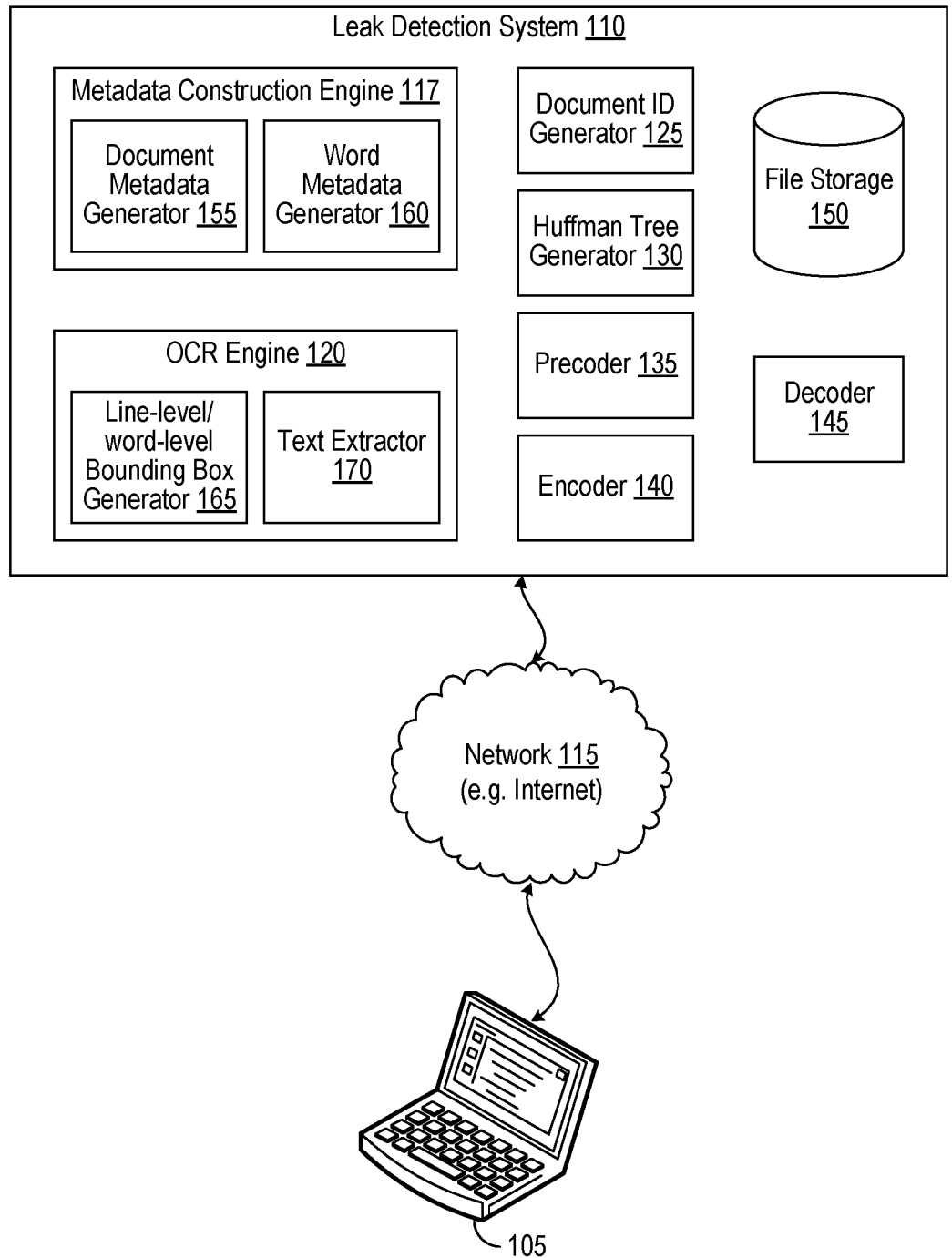
FIG. 1 depicts a computer-implemented system 100 supporting document leak detection in accordance with one embodiment.

FIG. 1 depicts a computer-implemented system 100 supporting document leak detection in accordance with one embodiment. A user terminal 105 provides access to a leak-detection system 110 via a network 115, e.g. the Internet. Leak-detection system 110 includes a metadata construction engine 117, an OCR engine 120, a Document ID generator 125, a Huffman tree generator 130, a precoder 135, an encoder 140, a decoder 145, and file storage 150. Metadata construction engine 117 includes a document metadata generator 155 and a word metadata generator 160. OCR engine 120 has a line level/word level bounding box generator 165 and a text extractor 170.

Leak-detection system 110 supports two main phases, a securing phase that embeds invisible watermarking into a document and an investigation phase that extracts the watermarking. In the securing phase, metadata construction engine 117 generates two metadata files for the document to be secured. Document metadata generator 155 produces document metadata and word metadata generator 160 produces word metadata. The metadata files are stored with the document in file storage 150 for later use in leak investigation.

The document under consideration may not have renderable text elements. OCR engine 120 is employed in such cases. For example, a document in the common portable document format (hereafter "PDF document") may include renderable images of text with or in lieu of ascii-coded characters. Text extractor 170 in OCR engine 120 extracts text elements, while bounding-box generator 165 bounds both lines and words in bounding boxes that define the visible areas of words and lines. OCR is accomplished using well-known algorithms, so a detailed discussion is omitted.

Document metadata generator 155 extracts and stores the following document metadata:

1. Number of pages. The number of pages in the PDF document is stored in this field. In case of an image file, the entire image is considered to be on a single page and hence the number of pages in this case amounts to one.
2. Page number. The page number of each page is stored in this field.
3. Line number. Each of the lines in the document is numbered sequentially as per the document and this line number is stored in this field.
4. Width and height of each line. OCR engine 120 crops the original document line by line. Once the line crop is obtained, the height and width of the line is measured as the height and width of the bounding box.
5. Line ID. Lines are numbered sequentially, and these numbers form the Line ID.
6. Line text. Text extractor 170 extracts the text from each of the lines for storage in this field.
7. List of word metadata. The metadata of words that appear in each of the lines is stored in this field.

Figure 2:
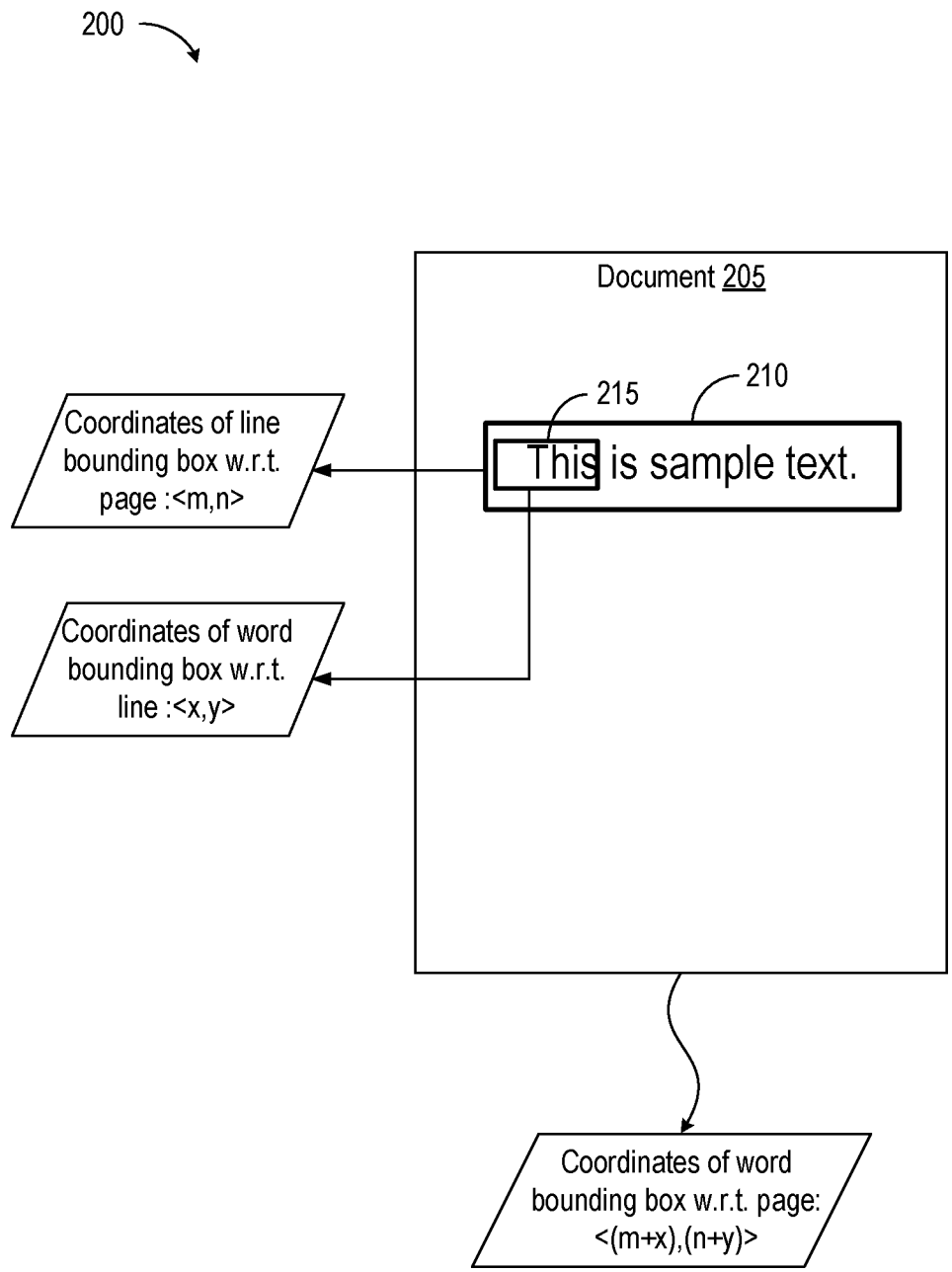
FIG. 2 is a diagram 200 illustrating the function of bounding-box generator 165 in locating renderable words and lines of a document 205 in accordance with one embodiment.

Word metadata generator 160 extracts and stores the following document metadata:

1. Page number. The page number on which the word appears is stored in this field.
2. Line number. The line number in which the word appears is stored in this field.
3. <x,y> coordinates of the word with respect to page. Bounding boxes and coordinates for a document watermarked according to one embodiment are illustrated in FIG. 2.
4. Height and width of each word. The height and width of the word is measured as the height and width of the bounding box around the word.
5. Word ID. Words are numbered sequentially, and the numbers are assigned to the corresponding word.
6. Word text. Text from each word extracted using the OCR engine is stored in this field.
7. Normalized height and Normalized width. Normalized height is calculated as the ratio between word height and line height, and normalized width as the ratio between word width and line width.

FIG. 2 is a diagram 200 illustrating the function of bounding-box generator 165 in locating renderable words and lines of a document 205 in accordance with one embodiment. Bounding box generator 165 identifies the boundaries and Cartesian coordinates <m,n> for each renderable line area 210 and the boundaries and Cartesian coordinates <x,y> for each renderable word area 215 within line area 210. Bounding-box generator 165 also locates word area 215 on document 205 with respect to the document boundaries as coordinates <(m+x),(n+y)> and provides these data to metadata construction engine 117. Document ID generator 125 generates a unique document ID for each document under consideration.

Some embodiments pre-encode (precode) user IDs before embedding them in a document. Precoding can be accomplished using e.g. a direct bitstream mapper that maps each character of the user ID to a fixed- or variable-length bit sequence, a precoded version of the user ID that can then be used to watermark the document. In the example of FIG. 1, document ID generator 125 generates a unique document ID that serves as a seed for precoding user IDs, a seed that is retained in secure storage by the document owner. The user ID specific to a particular person will therefore be precoded differently in different documents. Extracting a user ID from renderable dimensions of a document will thus return a precoded user ID that is insufficient to identify a leaker without knowledge of the document ID and the precoding process.

Precoding user IDs prevents malicious actors from extracting or encoding user IDs from or into the renderable dimensions of documents. Without precoding, a malicious actor might extract the user ID of an innocent user from the renderable dimensions of a document and encode this user ID into other sensitive documents in an effort to frame the innocent user.

One embodiment precodes user IDs using a Huffman algorithm. For each document, document ID generator 125 generates a unique document ID. The document ID and user IDs are generated from the same character set, and all the characters in the character set appear at least once in the document ID. Huffman tree generator 130 generates a Huffman tree and an associated Huffman table using the document ID. Precoder 135 then uses the Huffman table to precode the user ID into a bitstream for inclusion into the document. Encoder 140 encodes the precoded user ID into the document by modifying the renderable dimensions of the document's text. The document's Huffman table and tree are stored in storage 150 with other document metadata for later use in precoding and decoding user IDs. The Huffman algorithm encodes user IDs without information loss and with relatively few bits. Other embodiments omit precoding or use a different precoding scheme or schemes.

Figure 3:
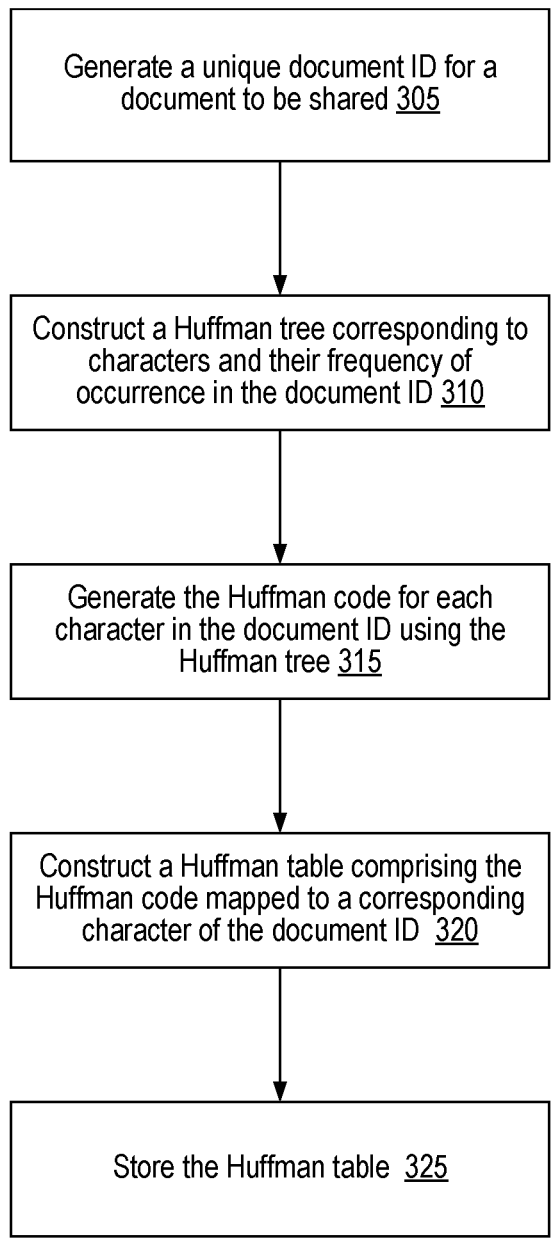
FIG. 3 is a flowchart 300 illustrating a process by which Document ID generator 125 and Huffman tree generator 130 generate a Huffman tree in accordance with one embodiment.

FIG. 3 is a flowchart 300 illustrating a process by which document ID generator 125 and Huffman tree generator 130 generate a Huffman tree in accordance with one embodiment. Beginning with step 305, Document ID generator 125 generates a document ID for the document under consideration using the character set employed for user ID(s). Huffman tree generator 130 then constructs a Huffman tree corresponding to the characters and their frequency of occurrence in the document ID (step 310). Huffman tree generator 130 uses the Huffman tree to generate a Huffman code for each character in the document ID (step 315), and then constructs a Huffman table by mapping the Huffman code to corresponding characters of the document ID (step 320). The Huffman table is then stored (step 325) with the document as document metadata in file storage 150.

Figure 4:
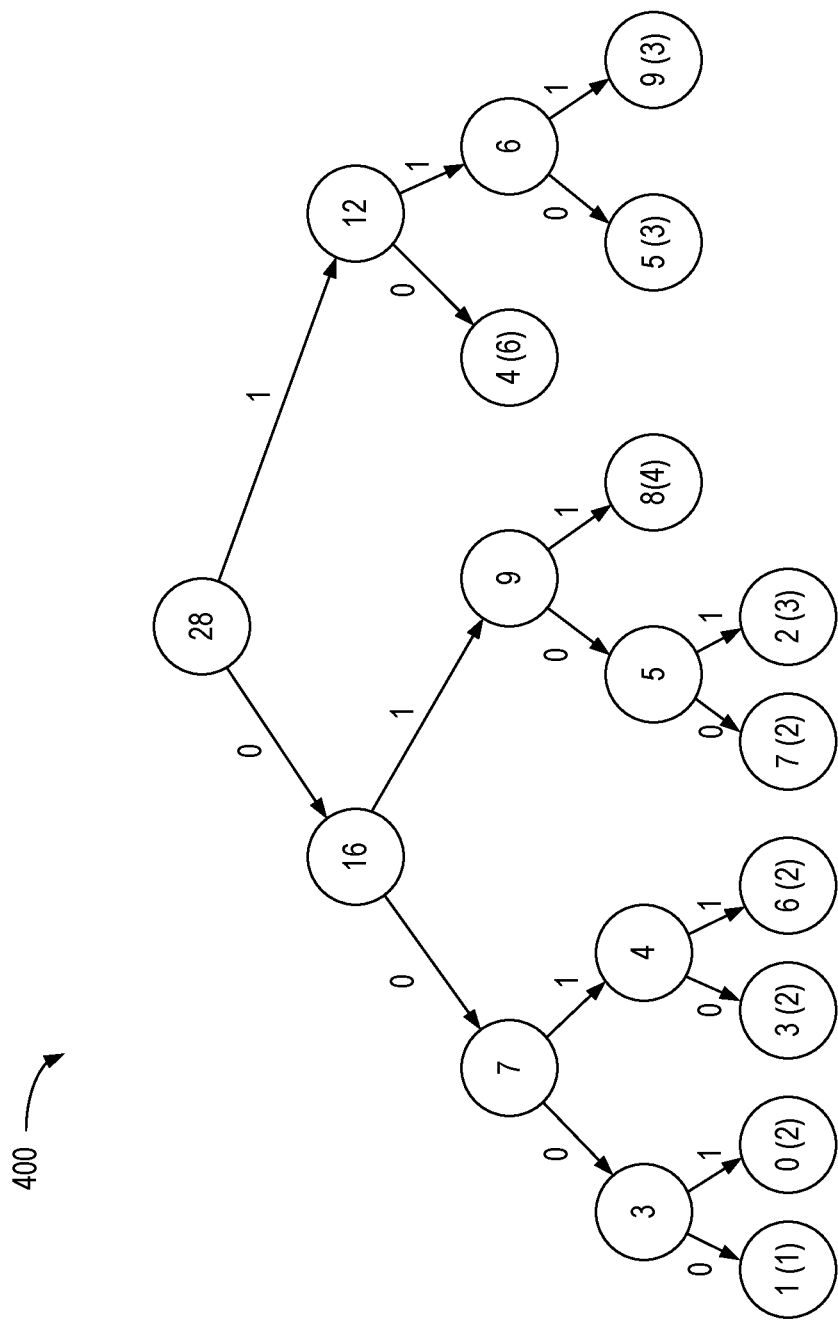
FIG. 4 depicts a Huffman tree 400 for encoding an example character sequence.

FIG. 4 depicts a Huffman tree 400 for encoding an example document ID 01234567892244838459067548. Huffman coding is well known so a detailed discussion is omitted. In brief, the frequency of each character is calculated and the characters are annotated accordingly, such as by associating each character with its frequency in parentheses. Applying this technique to the foregoing exemplary document ID gives: 0(2), 1(1), 2(3), 3(2), 4(6), 5(3), 6(2), 7(2), 8(4), 9(3). This result is sorted in non-decreasing order of frequency giving the list: 1(1), 0(2), 3(2), 6(2), 7(2), 2(3), 5(3), 9(3), 8(4), 4(6). Two least-frequent elements (e.g. 1(1) and 0(2)) are added as leaves and removed from the list. Their frequencies are merged at a node represented by the sum of their frequencies, three in this instance. The remaining elements are pairwise treated similarly to assemble tree 400. Transitions from non-leaf nodes are designated zero on the left and one on the right. The character represented by each leaf node can then be expressed using the bits that transition from the root node to the leaf. The most frequent leaves are closest to the root and are thus expressed using the fewest bits.

FIG. 5 is a Huffman table 500 corresponding to tree 400 of FIG. 4. Each digit from zero to nine is represented by a leaf node in tree 400. To construct table 500, each value of each leaf node is encoded to binary (ones and zeros) by traversing tree 400 from the root node (of value 28) to the leaf node. To encode Huffman code for a decimal value of "8," for example, one traverses from the root node to leaf 8 (4) via the bit sequence 011. A Huffman tree and Huffman table are derived for each document, using the respective document ID, and stored with the other document metadata.

Figure 6:
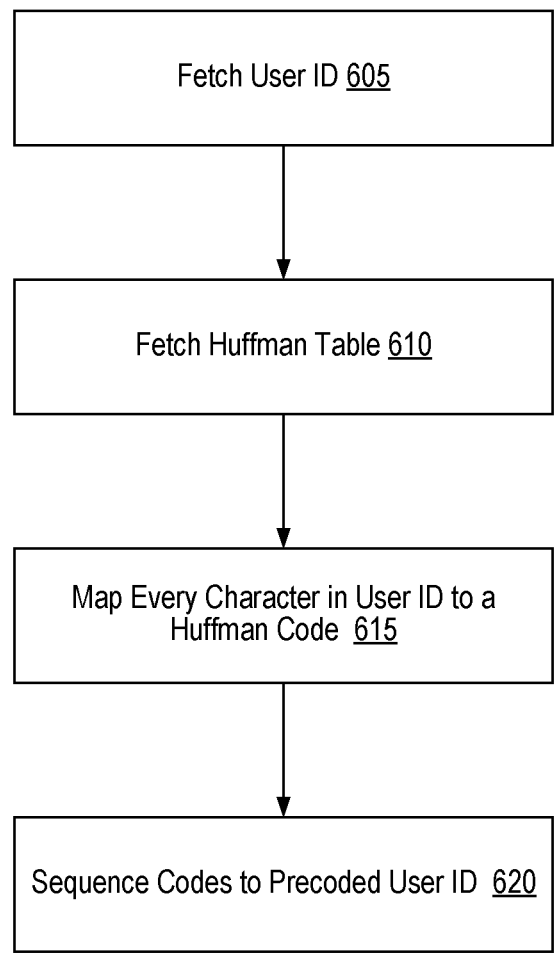
FIG. 6 is a flowchart 600 illustrating how precoder 135 generates a bitstream from the user ID and the Huffman table in accordance with one embodiment.

FIG. 6 is a flowchart 600 illustrating how precoder 135 precodes a user ID using Huffman table 500 of FIG. 5 in accordance with one embodiment. First, precoder 135 fetches the user ID and the Huffman table (step 605 and step 610). Next, precoder 135 maps every character in the user ID to a corresponding code from the Huffman table (615). The resulting sequence of Huffman codes is a precoded user ID (620). For example, user ID=1234 would be encoded from Table 1 as 0000, 0101, 0010, 10. The resulting precoded user ID would thus be 00000101001010.

Figure 7:
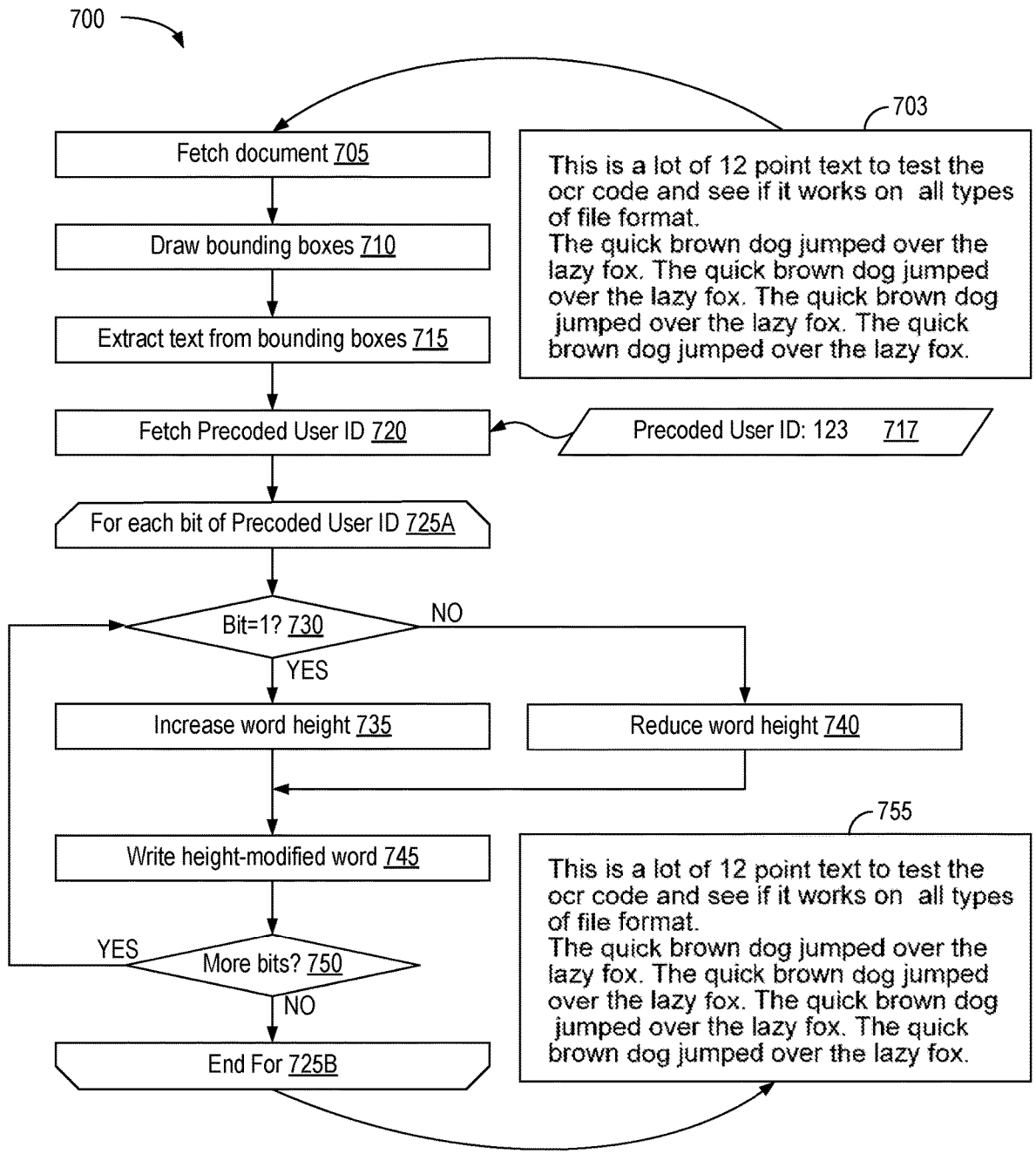
FIG. 7 is a flowchart 700 illustrating a method leak detection system 110 employs to encode a bitstream into a document in accordance with one embodiment.

FIG. 7 is a flowchart 700 illustrating a method employed by leak detection system 110 to encode a bitstream into a document 703 in accordance with one embodiment. Document 703 is sent from terminal 105 or fetched from storage 150 (step 705). OCR engine 120 draws bounding boxes around lines and words (step 710) and extracts text from within the bounding boxes (step 715). A precoded user ID 717, previously generated, is fetched from storage 150 (step 720). The user ID is "123" in this simple example. Next, as represented as a for-loop 725A/B, the precoded user ID is parsed bit-by-bit to introduce invisible watermarking into the document by encoding small height differences between the renderable dimensions of words. Per decision 730, if the current bit is one (zero) the height of the word under consideration is increased (decreased) by e.g. 1% (steps 735 and 740) and the height-modified word is written over the area encompassed by the bounding box associated with the modified word (step 745). As an example of a one percent word-height modification, assume a word's height is initially 14 px. When a bit of value one is encountered at decision 730 the word height is incremented by 0.14 px i.e. to 14.14 px. When a bit of value zero is encountered, the word height is decremented by 0.14 px i.e. to 13.86 px. If there are more bits, per decision 750, the flow returns to decision 730 for treatment of the next word responsive to the next bit. For loop 725A/B ends when there are no more bits in the bitstream. The process produces a document 755 that includes the text of original document 703 but in which the user ID is encoded in the rendered words of this example. A text element is "rendered" when it is perceivable by a user, such as on a page or screen, and "renderable" when stored in computer-readable media.

In this example, the base of a height-adjusted word remains in place. OCR engine 120 draws bounding boxes for every word in the document. Areas under the bounding boxes serve as word images. The 1% increase or decrease in height is applied to this word image. The modified word image is then placed over the original image thus resulting in no visible background transitions. In scenarios where the document has a non-white/color background or non-black font (color font), system 110 uses the spaces within the bounding boxes to ensure there is no visible difference between bounding areas of the applied high-adjusted words and their backgrounds caused by the height modifications.

A precoded user ID can be repeatedly encoded until the document under consideration runs out of words. Precoded user IDs thus encoded may be separated by end marks. In one embodiment, an end mark is a sequence of five words that are left unperturbed between words used to encode the precoded user IDs. Repeatedly embedding one or more user IDs aids in identifying leaks of partial documents (e.g., one of a set of pages or a crop or crops of one or more pages). In an embodiment in which the original document's text was in image form, system 100 can likewise provide the encoded content in image form.

Figure 8:
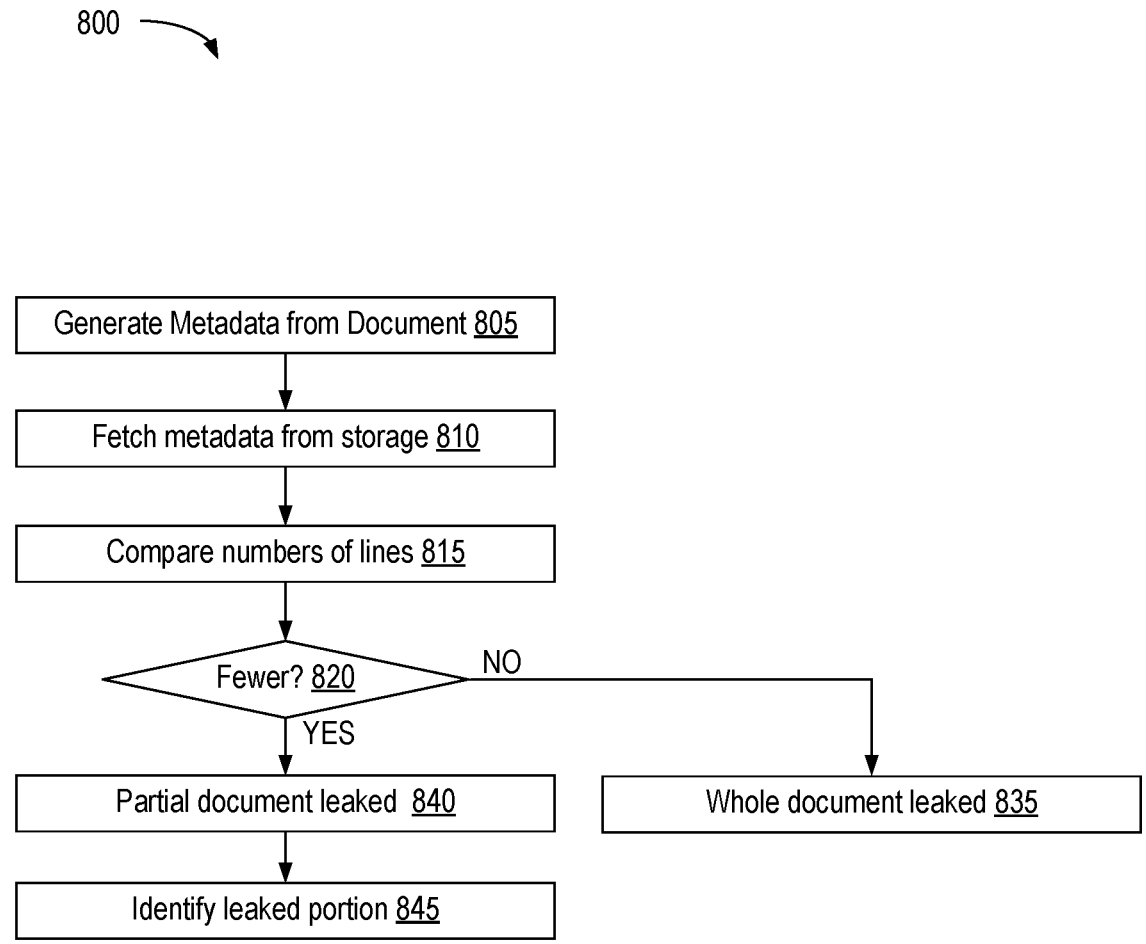
FIG. 8 depicts a process for distinguishing whether a leaked document was leaked in full or only partially.

FIG. 8 depicts a process for distinguishing whether a leaked document was fully or partially leaked. For example, the leaker could have downloaded or sent some or all of a digital document, taken a photo or screen shot of some or all of a screen-rendered document, or printed and shared one or more pages. These alternatives can be scaled differently to produce text elements of different heights but height-encoded data can nevertheless be recovered.

System 110 generates metadata from the leaked document as noted previously (step 805) and fetches the corresponding metadata of the original document from storage (step 810). System 110 then compares the two sets of metadata for differences, the number of lines in each document in this embodiment. Per decision 820, if the leaked document has no fewer lines, then system 110 concludes that the whole document was leaked (step 835). If the leaked document has fewer lines, however, then the leaked document is only a portion of the original (step 840).

System 110 then compares the original and leaked portion to identify the leaked portion within the original document (step 845). For that, a line-by-line text matching in each page of the documents is done by comparing the metadata of the two files. The  where the text in the leaked document matches with the one in the original document is considered to be the starting portion of the leaked partial document.

Figure 9:
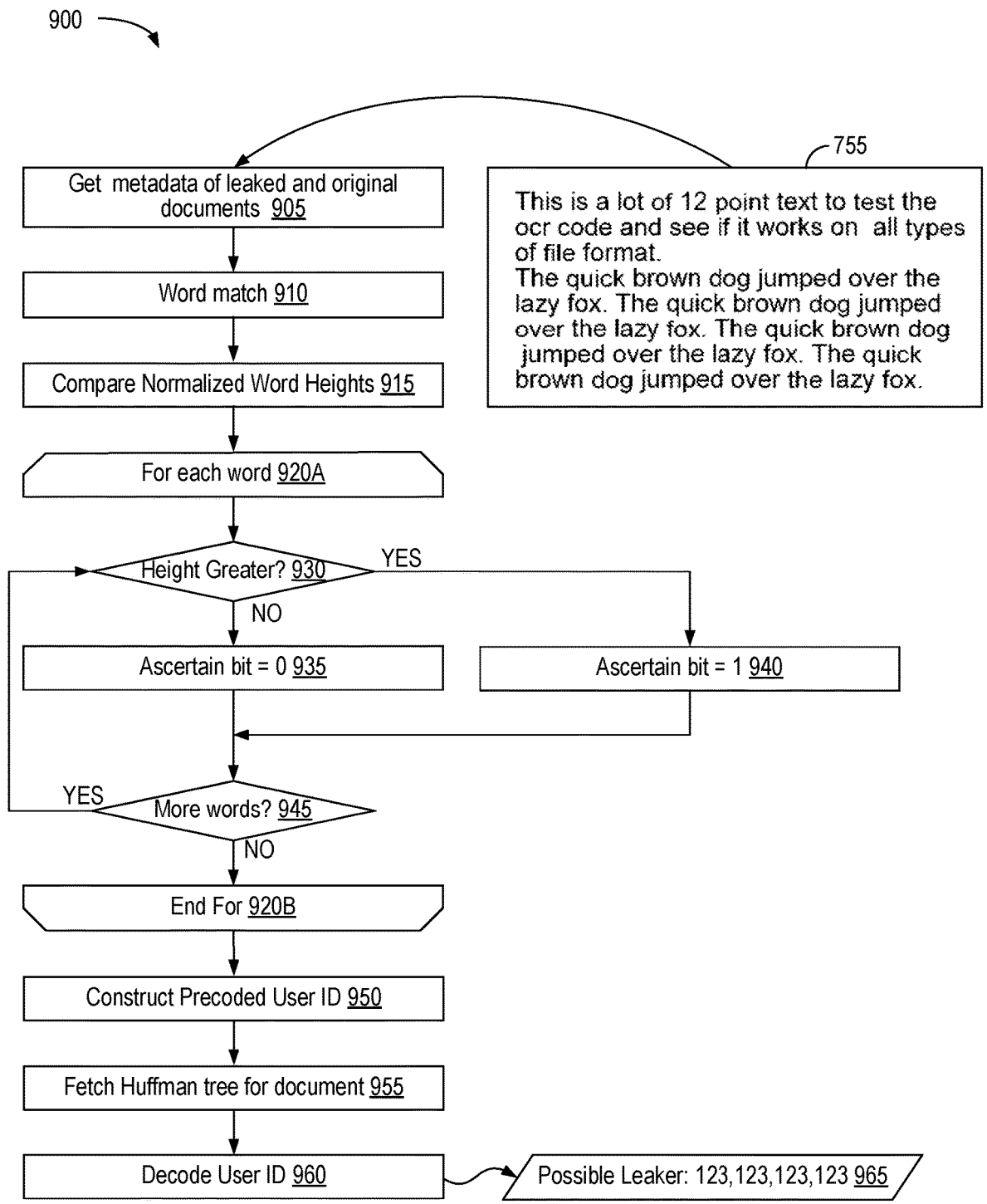
FIG. 9 is a flowchart illustrating a method by which an investigator (person/organization whose file was leaked by a bad actor) can use system 110 to identify the leaker of a leaked document.

FIG. 9 is a flowchart 900 illustrating a method by which an investigator (person/organization whose file was leaked by a bad actor) can use system 110 to identify the leaker of a leaked document. This example uses document 755 from FIG. 7, which includes the text of an original document with word-heights encoded with repeated instances of user ID "123". Metadata from the leaked document is extracted as detailed previously and metadata from the original document is fetched from storage (step 905). The words of the original and leaked documents are matched (step 910). The metadata relating to the matched words are then compared, in this example by comparing the normalized word heights of the leaked-document metadata with the original, unmodified word heights from the original document (step 915). Normalization is accomplished by calculating ratios of the dimensions of textual elements, such as the ratio of word height to line height or word width to line width. The use of ratios compensates for scaling differences between the original and leaked documents. For example, the word height of a document on one screen might be 14 px in a 200*200 image. A leaker using a higher-resolution screen to capture a 400*400 screenshot of the document might capture a 28 px word height in a leaked portion of the document. However, the ratio between word height and line height would remain constant.

As illustrated using a for loop 920A/B, the normalized word height of each word in the leaked document is compared with the normalized height of the corresponding word in the original document. The leaked document includes a user ID encoded as a bitstream in height-modified words. Per decision 930, if the height of a word in the original document is greater than (less than) that of the corresponding normalized word in the leaked document, then the word in the leaked document is ascertained as representing a binary zero (one); (steps 935 and 940). These word comparisons of for loop 920A/B continue until there are no more words to compare (decision 945). In some embodiments decision 930 can identify height matches between the words from the original and leaked documents and characterize such matches as a third bit value, e.g. a null value. Other encoding schemes can use more height variations to encode more data, reduce errors, or both.

System 110 constructs a bitstream in which the user ID is encoded from the bits output from for loop 920A/B (step 950), fetches the Huffman table associated with the document (step 955), and decodes the user ID using the Huffman tree (step 960). Decoding a precoded user ID starts from the root node of the Huffman tree and follows the transitions specified by the bitstream until a leaf is reached and a character thus decoded. The process then repeats from root to leaf until the bitstream ends. A decoded stream 965 repeating instances of user ID "123" identifies a possible leaker. System 110 can incorporate checksum-based approaches to embedding and recovery to reduce errors and enhance resiliency. A checksum is added to the bitstream to be embedded in the document. The Luhn algorithm is used to encode and validate bitstreams in one embodiment, though other checksum algorithms (e.g. the Verhoeff checksum) can also be used.

FIG. 10 illustrates a process 1000 for incorporating a checksum into a bitstream, a four-digit sample unique ID of 3492 in this example. The unique ID is traversed from left to right to left and the digits in the unique ID are numbered starting from 0. First, the digits in odd places are summed and henceforth referred to as "Sum of odd places." Second, the digits in even places are squared. If a squared digit is greater than 9, the individual digits in the squared number are summed up resulting in a single digit. The same procedure is followed for all digits in even places and the resulting numbers are summed and henceforth referred to as "Sum of even digits." Third, the Sum of odd digits and the Sum of even digits are added and a mod 10 operation is performed on the resulting number. The value obtained after mod 10 is appended along with the unique ID during the encoding process. The checksum verifies the integrity of the recovered user ID. Other embodiments can similarly support error correction.

The decoding process illustrated above in connection with FIG. 9 extracts data by comparing text elements in an encoded document with corresponding text elements in an original document that serves as a reference. Other embodiments extract data from encoded documents without a reference document. Instead, data is recovered using the relative dimensions of text elements within the encoded document. The document can be segmented into multiple units (paragraph, line etc.). A statistical analysis of e.g. word height can then be done in each segment. The words can then be categorized e.g. as words with maximum height, words with minimum height, and words whose height falls in between. The words with the maximum height could imply bit one and the words with minimum height could imply bit zero. Words whose height falls in between the aforementioned categories could refer to end markers. Encoding dimensions can be selected such that the average of maximum height and minimum height matches words that imply end markers. Segmenting documents into multiple units reduces the probability of error while decoding because different units (e.g. different paragraphs) may use different font.

Figure 11:
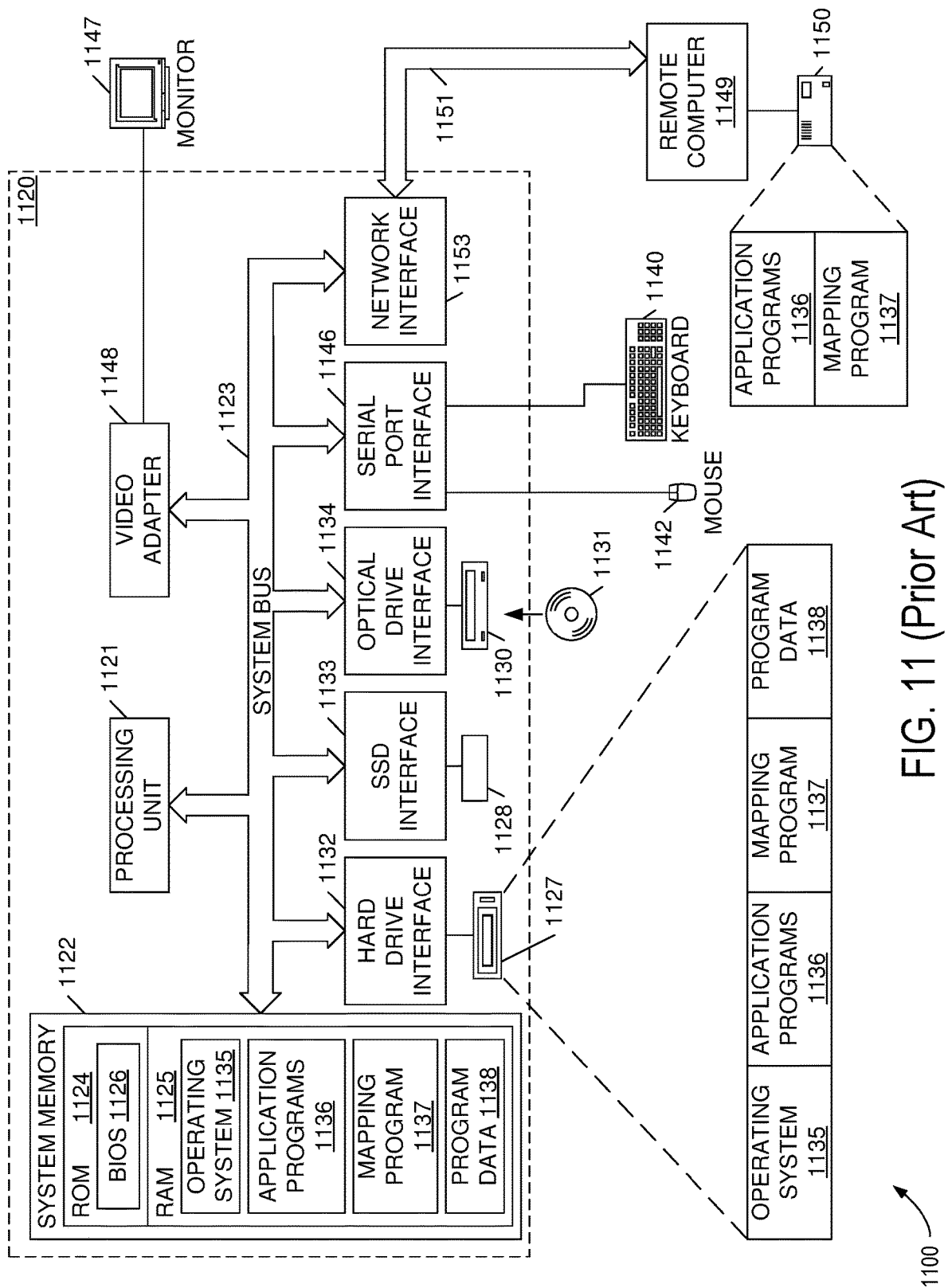
FIG. 11 and the following discussion are intended to provide a brief, general description of a suitable computing environment in which the invention may be implemented.

FIG. 11 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform tasks or implement abstract data types. In a distributed computing environment, program modules may be in both local and remote memory storage devices and may be executed by client and server computers.

FIG. 11 depicts a general-purpose computing system 1100 that can serve as a client or a server depending on the program modules and components included. One or more computers of the type depicted in computing system 1100 can be configured to implement leak-detection system 110 of FIG. 1 and perform the operations described with respect to prior figures. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 1100 includes a conventional computer 1120, including a processing unit 1121, a system memory 1122, and a system bus 1123 that couples various system components including the system memory to the processing unit 1121. The system bus 1123 may be any of several types of bus structures, including a memory bus or memory controller, a peripheral bus, and a local bus using any of a variety of bus architectures. The system memory includes read only memory (ROM) 1124 and random-access memory (RAM) 1125. A basic input/output system 1126 (BIOS), containing the basic routines that help to transfer information between elements within the computer 1120, such as during start-up, is stored in ROM 1124. The computer 1120 further includes a hard disk drive 1127 for reading from and writing to a hard disk, not shown, a solid-state drive 1128 (e.g. NAND flash memory), and an optical disk drive 1130 for reading from or writing to an optical disk 1131 (e.g., a CD or DVD). The hard disk drive 1127 and optical disk drive 1130 are connected to the system bus 1123 by a hard disk drive interface 1132, an SSD interface 1133, and an optical drive interface 1134, respectively. The drives and their associated computer-readable media provide nonvolatile storage of computer readable instructions, data structures, program modules and other data for computer 1120. Other types of computer-readable media can be used.

Program modules may be stored on disk drive 1127, solid state disk 1128, optical disk 1131, ROM 1124 or RAM 1125, including an operating system 1135, one or more application programs 1136, other program modules 1137, and program data 1138. An application program 1136 can use other elements that reside in system memory 1122 to perform the processes detailed above.

A user may enter commands and information into the computer 1120 through input devices such as a keyboard 1140 and pointing device 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port, universal serial bus (USB), or various wireless options. A monitor 1147 or other type of display device is also connected to the system bus 1123 via an interface, such as a video adapter 1148. In addition to the monitor, computers can include or be connected to other peripheral devices (not shown), such as speakers and printers.

The computer 1120 may operate in a networked environment using logical connections to one or more remote computers, such as a remote computer 1149 with local storage 1150. The remote computer 1149 may be another computer, a server, a router, a network PC, a peer device, or other common network node, and typically includes many or all of the elements described above relative to the computer 1120. The logical connections depicted in FIG. 11 include a network connection 1151, which can support a local area network (LAN) and/or a wide area network (WAN). Such networking environments are commonplace in offices, enterprise-wide computer networks, intranets, and the Internet.

Computer 1120 includes a network interface 1153 to communicate with remote computer 1149 via network connection 1151. In a networked environment, program modules depicted relative to the computer 1120, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A method for encoding a user identifier in words of a document, the method comprising:
   capturing original images of the words of the document, each of the original images having respective renderable dimensions encompassing a word area;
   changing the renderable dimensions of each of the word areas to create a scaled area corresponding to each of the word areas, the changed renderable dimensions of the scaled areas encoding the user identifier into the scaled areas; and
   replacing or covering the original images of the words with the corresponding scaled areas.

2. The method of claim 1, wherein capturing the original image of each of the words comprises delineating a bounding box around the word, the bounding box encompassing an original area that includes the word and background content.

3. The method of claim 1, wherein the background content includes a margin around the word to cover the word when the original area is scaled down.

4. The method of claim 2, wherein the extracting comprises recognizing the words.

5. The method of claim 1, wherein encoding the user identifier in the words of the document comprises associating the document with a document identifier, pre-encoding the user identifier with the document identifier into a bitstream, and encoding the bitstream into the scaled areas of the document.

6. The method of claim 5, wherein the pre-encoding maps each character of the user identifier to a variable-length bit sequence.

7. The method of claim 5, further comprising extracting the bitstream from the document.

8. The method of claim 7, wherein the document is a leaked version of an original document identified by the document identifier, the method further comprising decoding the document identifier from the bitstream, comparing the leaked version with the original document, and determining whether the leaked version is a portion of the original document.

9. The method of claim 5, further comprising encoding instances of the bitstream into the scaled areas of the document.

10. The method of claim 9, wherein scaled areas are of maximum and minimum heights, the method further comprising separating the instances of the bitstream with words of an average of the maximum and minimum heights that serve as an end marker.

11. The method of claim 9, wherein the document includes pages, and wherein every page includes at least a portion of the bitstream, an end marker, or both.

12. A method of identifying a user associated with a document, the method comprising:
    detecting lines of words in the document, the lines and the words having respective line dimensions and word dimensions, including word heights, word widths, line heights, and line widths;
    normalizing the word heights relative to the line heights and the word widths relative to the line widths;
    scaling the word dimensions responsive to the normalized word heights and normalized word widths; and
    decoding a user identifier from the scaled word dimensions.

13. The method of claim 12, further comprising scanning at least a portion of the document to extract the lines of words.

14. The method of claim 12, wherein the document is associated with a document identifier, the method further comprising decoding the decoded user identifier using the document identifier.

15. The method of claim 14, wherein decoding the decoded user identifier using the document identifier comprises extracting a bitstream from the dimensions and extracting the user identifier from the bitstream with the document identifier.

16. A method for encoding at least a portion of a user identifier in a line of words of a line height, the method comprising:
    capturing original images of the words, each of the original images having a word height;
    changing the heights of the original images to create scaled word areas collectively encoding the user identifier; and
    replacing or covering the original images of the words with the scaled word areas.

17. The method of claim 16, wherein each of the original images includes a margin for the imaged word and the scaled areas of at least a subset of the scaled areas are smaller than the original images.

18. The method of claim 17, wherein the margins cover the words in the original images.

19. The method of claim 16, wherein the line of words is of a line width and each of the original images have a word width, the method further comprising:
    normalizing the word heights, wherein each of the normalized word heights is the ratio between the word height and the line height; and
    changing the normalized heights of the original images to create the scaled word areas.

* * * * *